United States Patent [19]
Albrecht

[11] Patent Number: 5,666,564
[45] Date of Patent: Sep. 9, 1997

[54] ZOOM FLASH WITH WAVE-LENS

[75] Inventor: Richard Edmund Albrecht, Honeoye Falls, N.Y.

[73] Assignee: Eastman Kodak Company, Rochester, N.Y.

[21] Appl. No.: 612,990

[22] Filed: Mar. 8, 1996

Related U.S. Application Data

[60] Provisional application No. 60/003553, Aug. 1, 1995.

[51] Int. Cl.$^6$ .......................... G03B 15/02; G03B 15/06
[52] U.S. Cl. ................................. 396/62; 396/175
[58] Field of Search ................ 354/149.1; 362/16, 362/18; 396/61, 62, 162, 164, 175, 200

[56] References Cited

U.S. PATENT DOCUMENTS

| | | | |
|---|---|---|---|
| 3,305,294 | 2/1967 | Alvarez | 351/169 |
| 3,583,790 | 6/1971 | Baker | 350/184 |
| 4,312,582 | 1/1982 | Pizzuti et al. | 354/196 |
| 4,338,011 | 7/1982 | Pizzuti | 354/196 |
| 4,515,453 | 5/1985 | Wakabayashi et al. | 354/149.1 |
| 4,821,053 | 4/1989 | Dowe et al. | 354/149.1 |
| 4,914,461 | 4/1990 | Hori | 354/149.1 |
| 4,965,615 | 10/1990 | Fujita et al. | 354/145.1 |
| 4,983,998 | 1/1991 | Hirohata et al. | 354/149.1 |
| 4,991,063 | 2/1991 | Stoneham | 362/18 |
| 5,012,262 | 4/1991 | Mogamiya et al. | 354/149.1 |
| 5,040,007 | 8/1991 | Hagiuda | 354/145.1 |
| 5,050,044 | 9/1991 | Shibayama | 362/18 |
| 5,083,146 | 1/1992 | Ueda | 354/149.1 |
| 5,126,778 | 6/1992 | Wheeler et al. | 354/414 |
| 5,157,429 | 10/1992 | Haraguchi et al. | 354/149.1 |
| 5,331,362 | 7/1994 | DiRisio | 354/149.1 |
| 5,477,292 | 12/1995 | Kanai et al. | 354/149.1 |
| 5,543,875 | 8/1996 | Machida et al. | 354/149.1 |

*Primary Examiner*—Safet Metjahic
*Assistant Examiner*—Christopher E. Mahoney
*Attorney, Agent, or Firm*—Thomas H. Close

[57] ABSTRACT

A photographic flash apparatus includes a flash tube for producing a flash of light; a reflector located behind the flash tube for concentrating the light produced by the flash tube into a beam having a particular scene coverage angle; and an adjustable wave-lens device positioned in the beam to adjust the scene coverage angle of the beam. The adjustable wave-lens device includes first and second wave-lens elements and a lever for displacing one of the wave-lens elements with respect to the other to vary the optical power of the adjustable wave-lens element, thereby adjusting the scene coverage angle of the beam.

7 Claims, 3 Drawing Sheets

ZOOM FLASH WITH WAVE-LENS

CROSS REFERENCE TO RELATED APPLICATION

Reference is made to and priority claimed from U.S. Provisional application Ser. No. 60/003,553, filed 01 August, 1995, entitled ZOOM FLASH WITH WAVE-LENS, now abandoned.

FIELD OF THE INVENTION

The invention relates generally to the field of photography, and in particular to improved photographic flash apparatus, more particularly to photographic flash apparatus having means for changing the scene coverage angle of the flash illumination.

BACKGROUND OF THE INVENTION

In the field of flash photography there is often a need to change the scene coverage angle of the illumination to match the scene coverage angle of a zoom lens. There is an advantage in doing this because the range, or distance of proper exposure can be extended for the telephoto end of the zoom. In addition to this, the scene coverage angle can be increased to illuminate the area needed for the wide angle end of the zoom. Electronic flash apparatus generally includes a flash lamp and a flash reflector for directing the light from the flash lamp into a beam having a particular scene coverage angle. The need to change the coverage of the flash has long been recognized. Matching the light pattern to the photographic field and using a means of auto exposure is one way to conserve on energy used per photograph. This is important because in most cases the flash is portable and battery powered. By minimizing the energy used per photo, the recycle time to charge up for the next flash is shorter and more photos can be taken per battery charge. It is also well known that the flash distance for a telephoto lens can be increased by concentrating the light into the smaller scene coverage angle of this lens. With these benefits in mind, a number of techniques have been developed to change the scene coverage angle of a photographic flash apparatus.

One way to change the scene coverage angle of the flash is by moving the flash lamp along the optical axis of the flash reflector. As the lamp is moved away from the back of the reflector the pattern of light is spread to cover a larger area. A disadvantage to this method is that the flash lamp must be moved in a very accurate manner. If the mechanism allows the flash lamp to move off the optical axis of the reflector, then the pattern will also shift as a function of the location of the flash lamp with respect to the reflector. Flash reflectors generally have end plates which must have a slots to allow the lamp to move. This reduces the area of the end plates and thus their reflection efficiency.

Another method of changing the scene coverage angle is by moving a lens in front of the reflector along its optical axis. This method is very effective, but it requires sufficient clearance in front of the reflector for the lens to travel along its optical axis and some mechanism for supporting and moving the lens.

A still further method of changing the scene coverage angle of a flash by changing the shape of the reflector. This provides an opportunity to change the distribution of light within the scene coverage angle in addition to changing the scene coverage angle itself. While this is a valuable feature, the mechanism to do this can be complicated and sensitive to operate. Depending on how much change is needed, the volume of the reflector may change substantially.

SUMMARY OF THE INVENTION

The present invention is directed to overcoming one or more of the problems set forth above. Briefly summarized, according to one aspect of the present invention, a photographic flash apparatus includes a flash tube for producing a flash of light; a reflector located behind the flash tube for concentrating the light produced by the flash tube into a beam having a particular scene coverage angle; and an adjustable wave-lens device positioned in the beam to adjust the scene coverage angle of the beam, the adjustable wave-lens device includes first and second wave-lens elements and means for displacing one of the wave-lens elements with respect to the other in a direction perpendicular to the beam to vary the optical power of the adjustable wave-lens device, thereby adjusting the scene coverage angle of the beam.

In a preferred embodiment, the photographic flash apparatus of the present invention is employed with a photographic camera having a zoom lens. The photographic flash apparatus is designed to cover the narrowest photographic field, and then spread by the adjustable wave-lens device to match the wide angle end of the zoom range. The light distribution is spread by using two special lens elements, called wave-lenses, that have a wave shape on the adjacent sides, and moving one element relative to the other. If the pitch of the wave shape is small, then the motion needed to spread the light is also small. The design variables are sufficient to allow for a different spread in the vertical direction than in the horizontal direction.

The advantage of using this system is that it is very compact and requires as much or as little motion as is desired in a direction perpendicular to the light beam to produce the change in scene coverage angle. The flash illumination system can be designed to match the mechanical needs of the photographic camera. The relative shift of wave-lens elements can be made small and easy to accomplish. Very little additional volume is needed to make room for this motion. Cameras that are being designed today are very compact and have little room for mechanisms that need large motions.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

This invention provides a way to change the scene coverage angle of a photographic flash apparatus with simple, small, and reliable movements in a package that doesn't require significant volume changes. The design of this system starts with a standard trough type reflector that is designed to efficiently match the smallest scene coverage angle, or the telephoto end of the zoom range and includes an adjustable wave-lens device for expanding the scene coverage angle as the zoom lens is moved from the telephoto end to the wide angle end of the zoom range. The adjustable wave-lens device includes two wave-lens elements that are designed to be mounted in front of the reflector of the flash apparatus.

Figure 1:
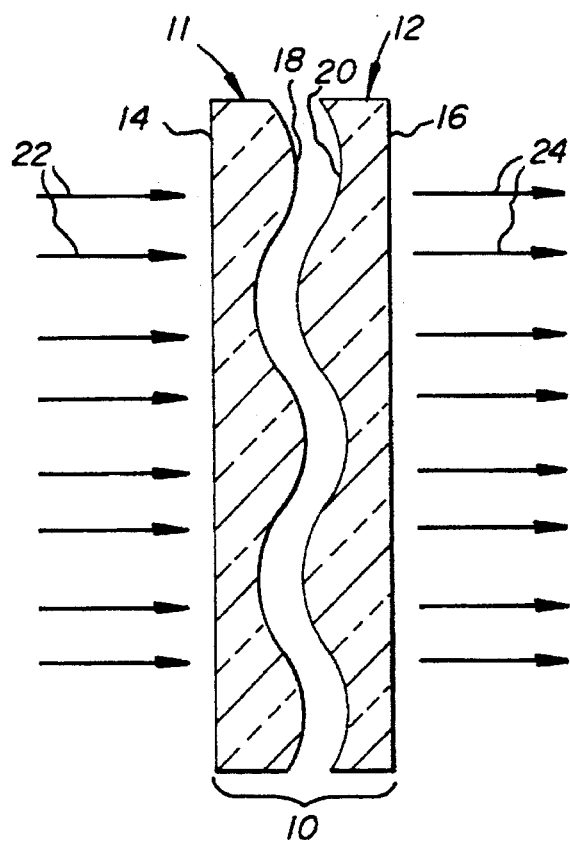
FIG. 1 is a side view of an adjustable wave-lens device employing wave-lens elements, showing the optical effect with the elements aligned to produce minimum optical spread of a beam of light.
Figure 2:
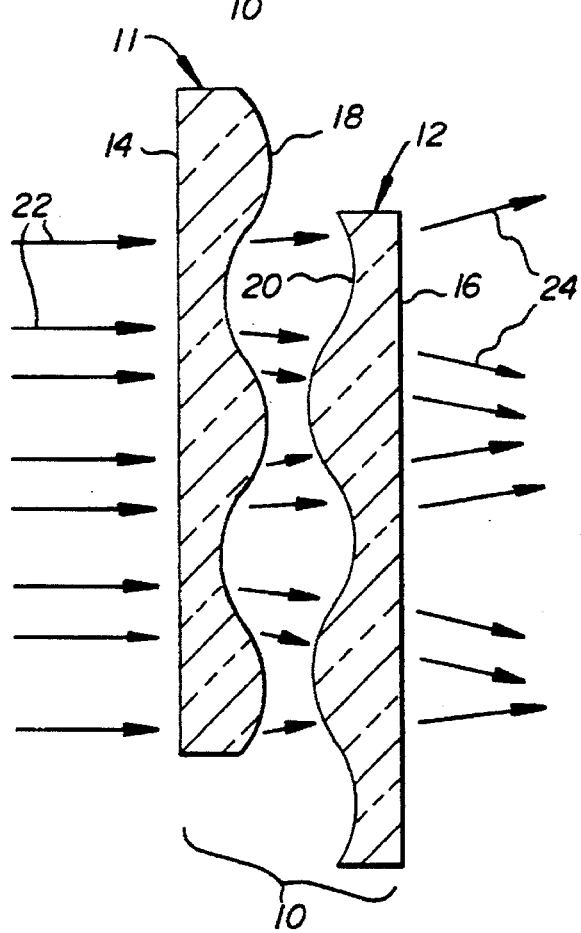
FIG. 2 is a side view of the adjustable wave-lens device employing wave-lens elements, showing the optical effect with the elements shifted to produce maximum optical spread of a beam of light.

FIG. 1 shows a side view of the adjustable wave-lens device generally designated 10, having two of these wave-lens elements 11 and 12 with their wave pattern surfaces face to face. The wave-lens elements 11 and 12 are plates of optically transparent material having planar surfaces 14 and 16, and linear sinusoidal wave pattern surfaces 18 and 20. In this position the power of the first wave-lens 11 is roughly canceled out by the power of the second wave-lens 12, as illustrated by entering light beams 22 and exiting light beams 24. When the wave-lens elements are mutually displaced by one half wavelength in a direction perpendicular to the entering light beam 22 as shown in FIG. 2, the optical power of the two wave pattern surfaces is added together and the net result is that the light pattern is spread as illustrated by the entering light beams 22 and the exiting light beams 24.

By selecting the amplitude of the wave pattern in the wave-lens elements, the amount of spread in the exiting light beam 24 can be controlled. The pitch of the wave-lens elements 11 and 12 is chosen based on how much relative displacement between the two wave-lens elements is desired to move from minimum to maximum optical effect. The light distribution in the exiting light beam 24 can also be controlled by varying the shape of the wave pattern on the wave-lens elements 11 and 12. In General the shape of the wave pattern on the wave-lens elements is sinusoidal, but this shape can be altered if a different light distribution is desired.

Figure 3:
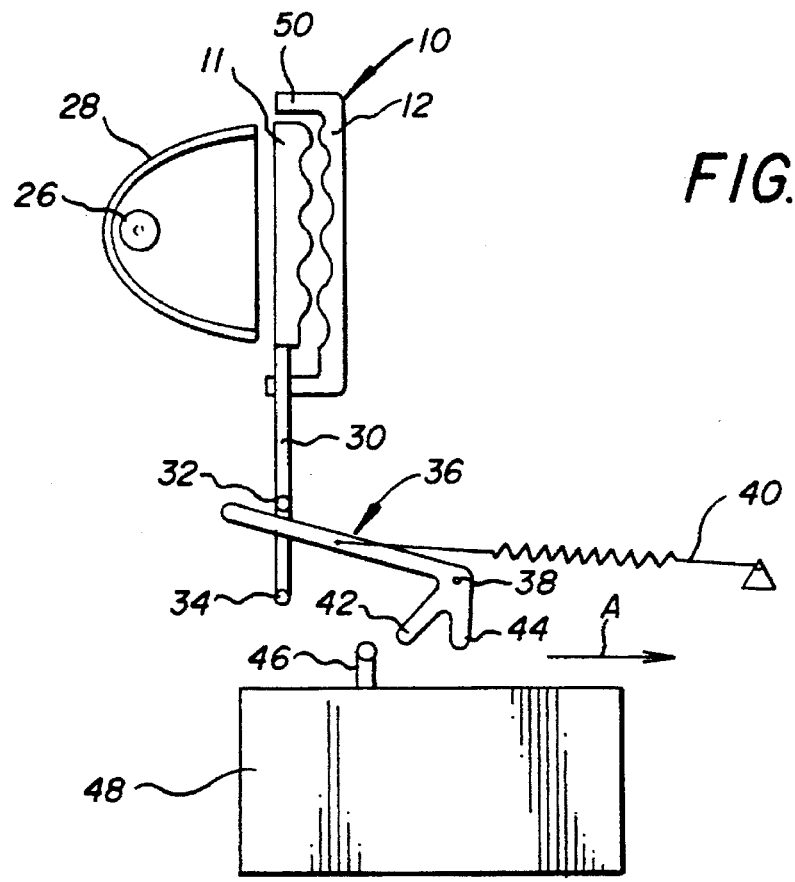
FIG. 3 is a schematic diagram illustrating a photographic flash apparatus according to the present invention, employed in a photographic camera having a zoom lens, with the zoom lens in the wide angle half of its zoom range.

If the illumination optics can satisfy the zoom lens needs with only two positions, the mechanism that links the photographic flash apparatus to the zoom lens can be a simple toggle mechanism. FIG. 3 is a schematic diagram showing a photographic flash apparatus according to the present invention, employing such a toggle mechanism. The photographic flash apparatus includes a flash lamp 26, a reflector 28, and an adjustable wave-lens device 10. Wave-lens element 11 is mounted for sliding up and down and includes an extension 30 having a pair of pins 32 and 34. A toggle lever 36 is mounted on a pivot 38 and extends between pins 32 and 34 of extension 30. An over center spring 40 urges toggle lever against pin 32, or against pin 34. Toggle lever 36 includes a fork having first and second prongs 42 and 44 that are arranged to be engaged by a pin 46 carried by a zoom lens 48 mounted for movement in the photographic camera (not shown). When the zoom lens 48 is in a wide angle position as shown in FIG. 3, the over center spring 40 urges the toggle lever 36 against pin 32 to urge wave-lens element 11 against a stop 50 to produce a maximum scene coverage angle of the light beam from the flash apparatus.

When the zoom lens 48 travels beyond a predetermined point in the direction of arrow A toward its telephoto position, pin 46 engages prong 44 of toggle lever 36, urging the toggle lever 36 in a counter clockwise direction. As the over center spring 40 passes pivot 38, the over center spring flips the toggle lever 36 against pin 34, sliding the movable wave-lens element 11 until it rests against a stop 52 (as shown in FIG. 4) that correctly positions the adjustable wave-lens device 10 for the telephoto zoom range.

Figure 4:
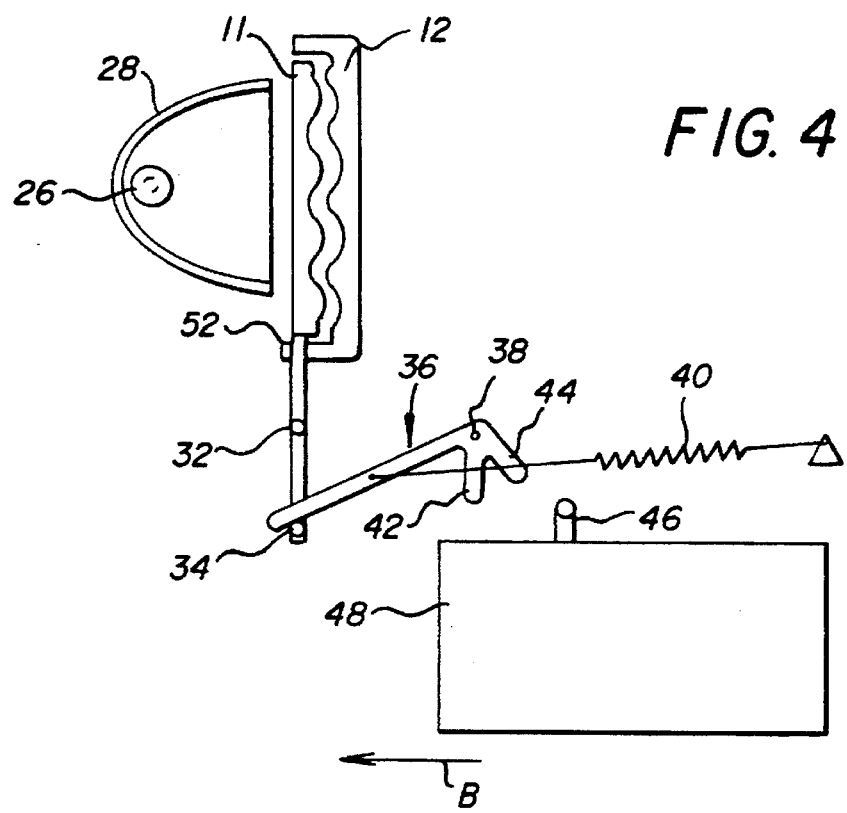
FIG. 4 is a schematic diagram illustrating a photographic flash apparatus according to the present invention, employed in a photographic camera having a zoom lens, with the zoom lens in the telephoto half of its zoom range.

When the zoom lens 48 moves back past the predetermined point in the direction of arrow B in FIG. 4, pin 46 engages prong 42 to flip the toggle in the other direction. This action slides the wave-lens 11 back against stop 50 to position the adjustable wave-lens device 10 for the wide angle range. This apparatus very accurately positions the wave-lens elements relative to one another. In addition it permits the use of very small pitch wave shapes on the wave lens elements, allowing small motions of only 0.005 and 0.010 inch to produce the desired changes in scene coverage angle of the flash apparatus.

Figure 5:
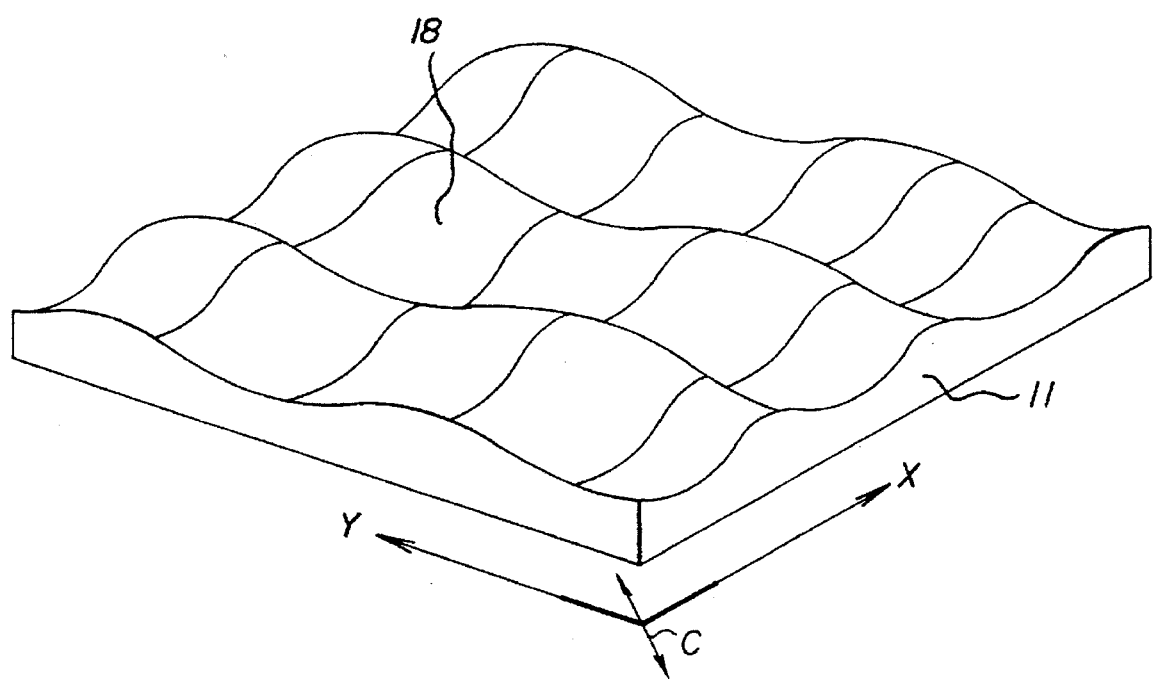
FIG. 5 is a schematic diagram showing an alternative wave pattern surface for the wave-lens elements employed in the present invention.

According to an alternative embodiment, the wave-lens elements 11 (and 12) may have a two dimensional sinusoidal patterned surface 18 (and 20), resembling a waffle, as shown in FIG. 5. With this pattern, relative displacement of the wave-lens elements in the X-direction will result in adjusting the scene coverage angle in the X-direction, relative displacement in the Y-direction will adjust scene angle coverage in the Y-direction, and diagonal displacement in the direction of arrow C will adjust scene angle coverage in both the X and Y directions.

The mechanism shown in FIGS. 3 and 4 can be modified for use of the bi-directional wave-lens pattern by replacing the wave-lens elements 11 and 12 with elements having a two dimensional sinusoidal pattern arranged so that the motion of element 11 is diagonal to the X and Y directions of the pattern.

The photographic flash apparatus of the present invention may also be used to control exposure in a simple flash camera that does not have automatic exposure control. For example, the adjustable wave-lens device 10 can be coupled to a close-up switch on the camera so that the maximum scene coverage angle of the beam is achieved when in a close-up mode, thereby wasting some of the flash light and avoiding over exposure of a close-up shot.

The invention has been described with reference to preferred embodiments. However, it will be appreciated that variations and modifications can be effected by a person of ordinary skill in the art without departing from the scope of the invention. For example, a spiral pattern of waves may be provided on the wave-lens elements and the scene coverage angle adjusted by rotating one of the wave-lens elements relative to the other. Either type of wave lens may be used in a continuously variable system, not just a toggle-type system.

PARTS LIST 10 adjustable wave-lens device
11 wave-lens element
12 wave-lens element
14 planar surface of wave-lens element 16 planar surface of wave-lens element
18 wave pattern surface of wave-lens element
20 wave pattern surface of wave-lens element
22 entering light beam
24 exiting light beam
26 flash lamp
28 reflector
30 extension
32 pin
34 pin
36 toggle lever
38 pivot
40 over-center spring
42 first prong
44 second prong
46 pin
48 zoom lens
50 stop
52 stop

I claim:

1. A photographic flash apparatus, comprising:
   a) a flash robe for producing a flash of light;
   b) a reflector associated with the flash tube for concentrating the light produced by the flash tube into a beam having a particular scene coverage angle; and
   c) an adjustable wave-lens device positioned in the beam to adjust the scene coverage angle of the beam, the adjustable wave-lens device including first and second wave-lens elements having wave pattern surfaces such that in one relative position the power of the first wave lens element is roughly canceled out by the power of the second wave lens element and in a second relative position displaced from the first position in a direction perpendicular to the beam, the optical power of the two wave pattern surfaces is added together, and means for displacing one of the wave-lens elements with respect to the other to vary the optical power of the adjustable wave-lens device, thereby adjusting the scene coverage angle of the beam.

2. The photographic flash apparatus claimed in claim 1, in combination with a photographic camera having a zoom lens, and wherein the means for displacing one of the wave-lens elements with respect to the other is coupled to the zoom lens, whereby the scene coverage angle of the beam is adjusted in correspondence with the scene coverage angle of the zoom lens.

3. The photographic flash apparatus claimed in claim 2, wherein the means for displacing one of the wave-lens elements with respect to the other is a toggle mechanism arranged to adjust the adjustable wave-lens device to produce maximum scene coverage angle when the zoom lens is in a wide angle half of the zoom range, and minimum scene coverage angle when the zoom lens is in a telephoto half of the zoom range.

4. The photographic flash apparatus claimed in claim 1, wherein the wave-lens elements are optically transparent plates having a planar surface and a linear sinusoidal wave pattern surface, arranged with the wave pattern surfaces facing each other, and wherein the displacing means displaces one of the wave-lens elements with respect to the other in a direction perpendicular to the linear wave pattern.

5. The photographic flash apparatus claimed in claim 1, wherein the wave-lens elements are optically transparent plates having a planar surface and a two dimensional sinusoidal wave pattern surface with sinusoidal waves in x and y directions with respect to the plane of the planar surface, arranged with the wave pattern surfaces facing each other, and wherein the displacing means displaces one of the wave-lens elements with respect to the other in a direction diagonal to the x and y directions of the wave lens elements for varying the scene coverage angle of the beam in both the x and y directions.

6. A method of adjusting the scene coverage angle of the beam in a photographic flash apparatus, comprising the steps of:
   a) positioning a pair of wave-lens elements in the beam, the wave-lens elements having wave pattern surfaces such that in one relative position the power of the first wave lens element is roughly canceled out by the power of the second wave lens element and in a second relative position displaced from the first position in a direction perpendicular to the beam, the optical power of the two wave pattern surfaces is added together; and
   b) displacing one of the wave-lens elements relative to the other to adjust the scene coverage angle of the beam.

7. The method claimed in claim 6, wherein the photographic flash apparatus is employed in a camera having a zoom lens, and wherein the displacing step is performed in concert with the adjustment of the zoom lens.

* * * * *